(12) United States Patent
Saito et al.

(10) Patent No.: US 8,553,320 B2
(45) Date of Patent: Oct. 8, 2013

(54) INFRARED OPTICAL SYSTEM AND INFRARED IMAGING APPARATUS

(75) Inventors: Masahiro Saito, Kanagawa (JP); Hidetoshi Kabasawa, Saitama (JP)

(73) Assignee: Sony Corporation, Tokyo (JP)

(*) Notice: Subject to any disclaimer, the term of this patent is extended or adjusted under 35 U.S.C. 154(b) by 106 days.

(21) Appl. No.: 13/338,560

(22) Filed: Dec. 28, 2011

(65) Prior Publication Data

US 2012/0176668 A1 Jul. 12, 2012

(30) Foreign Application Priority Data

Jan. 6, 2011 (JP) ................. 2011-000925

(51) Int. Cl.
*G02B 13/14* (2006.01)
(52) U.S. Cl.
USPC ............................................. 359/357
(58) Field of Classification Search
USPC .............................................. 359/356–357
See application file for complete search history.

(56) References Cited

U.S. PATENT DOCUMENTS

| | | | | | |
|---|---|---|---|---|---|
| 5,537,245 | A | * | 7/1996 | Migozzi | 359/356 |
| 5,852,516 | A | * | 12/1998 | Chipper | 359/676 |
| 5,909,308 | A | * | 6/1999 | Ulrich | 359/357 |
| 5,973,827 | A | * | 10/1999 | Chipper | 359/356 |
| 6,018,414 | A | * | 1/2000 | Chipper | 359/356 |
| 6,249,374 | B1 | * | 6/2001 | Chipper | 359/356 |
| 6,424,460 | B1 | * | 7/2002 | Kirkham | 359/353 |
| 6,999,243 | B2 | * | 2/2006 | Chipper | 359/690 |
| 7,369,303 | B2 | * | 5/2008 | Tejada | 359/356 |
| 7,567,392 | B2 | * | 7/2009 | Tamura | 359/785 |
| 7,859,747 | B2 | * | 12/2010 | Hiraiwa et al. | 359/356 |
| 8,101,918 | B1 | * | 1/2012 | Mercado | 250/352 |
| 2006/0028713 | A1 | * | 2/2006 | Hall | 359/357 |
| 2011/0216397 | A1 | * | 9/2011 | Kawaguchi et al. | 359/357 |
| 2013/0083200 | A1 | * | 4/2013 | Saito et al. | 348/164 |

FOREIGN PATENT DOCUMENTS

| | | | |
|---|---|---|---|
| JP | 2008-128913 | A | 6/2008 |
| JP | 2009-063942 | A | 3/2009 |
| JP | 2010-039243 | A | 2/2010 |

* cited by examiner

*Primary Examiner* — Mark Consilvio
(74) *Attorney, Agent, or Firm* — Wolf, Greenfield & Sacks, P.C.

(57) ABSTRACT

An infrared optical system includes: a first optical element, a second optical element, a third optical element, and a fourth optical element arranged along a direction from an object side toward an image plane side, wherein the fourth optical element has positive refracting power, an aperture is provided between the second optical element and the third optical element, the first and fourth optical elements are made of any one of silicon (Si), chalcogenide glass, and zinc sulfide (ZnS), and the second and third optical elements are made of a resin material, and at least one of a surface facing the object and a surface facing the image plane of each of the second and third optical elements is an aspheric surface.

17 Claims, 12 Drawing Sheets

FIG.4
EXAMPLE 1

FIG.5

| | SURFACE NUMBER | RADIUS OF CURVATURE (mm) | MATERIAL | DISTANCE BETWEEN SURFACES (mm) | ECCENTRICITY | A4 | A6 | A8 | A10 |
|---|---|---|---|---|---|---|---|---|---|
| OBJECT | S0 | | | 1000 | | | | | |
| FIRST LENS | S1 | INFINITY | Si | 2.44 | | | | | |
| | S2 | -140 | | 0.37 | | | | | |
| SECOND LENS | S3 | 6.349 | PE | 0.35 | -0.745 | -4.169E-04 | -3.254E-06 | -8.075E-09 | 1.208E-09 |
| | S4 | 5.583 | | 8.91 | -0.389 | -6.800E-04 | -2.449E-06 | -1.006E-07 | 3.554E-10 |
| APERTURE STOP | S5 | INFINITY | | 4.32 | | | | | |
| THIRD LENS | S6 | -6.419 | PE | 0.85 | -0.4219 | -6.118E-04 | 2.817E-05 | -3.958E-08 | -8.237E-09 |
| | S7 | -6.306 | | 2.08 | -0.2256 | -4.45E-04 | 2.568E-05 | -1.375E-07 | -2.475E-09 |
| FOURTH LENS | S8 | 43 | Si | 2.64 | | | | | |
| | S9 | INFINITY | | 12.01 | | | | | |
| SENSOR WINDOW | S10 | INFINITY | Si | 1 | | | | | |
| | S11 | INFINITY | | 0.95 | | | | | |

FIG. 7
EXAMPLE 2

FIG.8

| SURFACE NUMBER | | RADIUS OF CURVATURE (mm) | MATERIAL | DISTANCE BETWEEN SURFACES (mm) | ECCENTRICITY | A4 | A6 | A8 | A10 |
|---|---|---|---|---|---|---|---|---|---|
| OBJECT | S0 | INFINITY | | 1000 | | | | | |
| FIRST LENS | S1 | INFINITY | Si | 1.5 | | | | | |
| | S2 | -140.593 | | 0.233 | | | | | |
| SECOND LENS | S3 | 6.339 | PE | 0.35 | -0.748 | -4.203E-04 | -3.247E-06 | -7.082E-09 | 1.227E-09 |
| | S4 | 5.594 | | 9.016 | -0.389 | -6.756E-04 | -2.453E-06 | -1.019E-07 | 3.866E-10 |
| APERTURE STOP | S5 | INFINITY | | 4.115 | | | | | |
| THIRD LENS | S6 | -6.51 | PE | 0.85 | -0.423 | -6.128E-04 | 2.826E-05 | -3.716E-08 | -8.217E-09 |
| | S7 | -6.316 | | 2.693 | -0.228 | -4.409E-04 | 2.567E-05 | -1.383E-07 | -2.480E-09 |
| FOURTH LENS | S8 | 42.614 | Si | 3 | | | | | |
| | S9 | INFINITY | | 13.073 | | | | | |

| | SURFACE NUMBER | RADIUS OF CURVATURE (mm) | MATERIAL | DISTANCE BETWEEN SURFACES (mm) | ECCENTRICITY | A4 | A6 | A8 | A10 |
|---|---|---|---|---|---|---|---|---|---|
| OBJECT | S0 | | | 1000 | | | | | |
| FIRST LENS (Si PLATE) | S1 | INFINITY | Si | 1.5 | | | | | |
| | S2 | INFINITY | | 0.8 | | | | | |
| SECOND LENS | S3 | 6.605 | PE | 0.4 | -0.815 | -4.592E-04 | -3.212E-06 | -1.778E-08 | 8.381E-10 |
| | S4 | 6.2 | | 9.64 | -0.498 | -6.526E-04 | -2.396E-06 | -7.420E-08 | 9.962E-10 |
| APERTURE STOP | S5 | INFINITY | | 7.597 | | | | | |
| THIRD LENS | S6 | -7.66 | PE | 0.85 | -0.278 | -8.692E-04 | 2.173E-05 | -1.215E-07 | -3.630E-09 |
| | S7 | -7.594 | | 0.199 | -0.138 | -6.931E-04 | 1.985E-05 | -1.715E-07 | -1.112E-09 |
| FOURTH LENS | S8 | 42 | Si | 3 | | | | | |
| | S9 | INFINITY | | 16.616 | | | | | |

FIG.12

INFRARED OPTICAL SYSTEM AND INFRARED IMAGING APPARATUS

FIELD

The present disclosure relates to an infrared optical system used in a system that captures an infrared image, for example, a thermograph and a night vision device, and an infrared imaging apparatus using the infrared optical system.

BACKGROUND

Far-infrared light has a wavelength band ranging from 8 to 12 µm and is emitted, for example, from humans and animals in the form of heat, that is, in the form of infrared radiation. In view of the fact, far-infrared light is used in imaging in a dark place, observation of a temperature distribution, and other similar applications.

An optical system for collecting far-infrared light includes no glass lens for collecting typical visible light due to its low transmittance for far-infrared light but in many cases a lens made of germanium (Ge) or any other material that transmits a sufficient amount of infrared light. Since germanium has a high refractive index of about four, the surface reflectance is high but absorptance is nearly zero, which allows a high transmittance of 90% or higher to be achieved when an appropriate antireflection film is coated.

Germanium is, however, very expensive because it is a rare mineral.

Lens materials that are less expensive but have lower transmittance than germanium include silicon (Si), zinc sulfide (ZnS), zinc selenide (ZnSe), chalcogenide glass, which is a compound of chalcogen and germanium, and other crystalline materials.

Although these materials are inexpensive, they are disadvantageously very hard, as in the case of Ge. That is, since they are very hard, it takes long hours to process them and it is hence difficult to reduce the cost in some cases. In particular, to polish any of the materials into an aspheric shape, it is necessary to use a precise manufacturing apparatus for long hours, typically resulting in an increase in cost.

Press working of zinc sulfide (ZnS) and chalcogenide glass is under investigation, but a lens or an optical system for far-infrared light has not yet been produced at low cost so far.

JP-A-2010-39243, JP-A-2009-63942, and JP-A-2008-128913, for example, describe infrared optical systems of related art.

For example, JP-A-2010-39243 discloses an optical system using three Ge lenses. The optical system shows excellent optical characteristics within a viewing angle of 30 degrees or greater.

Further, in JP-A-2010-39243, using spherical lenses allows the processing cost to decrease.

However, since Ge is a very expensive material in the first place, an inexpensive device is not achieved.

In JP-A-2009-63942, ZnS, the material cost of which is less expensive than Ge, is used. To reduce a greater amount of aberration resulting from the fact that ZnS has a refractive index lower than that of Ge, aspheric surfaces are employed. As a result, difficulty in processing aspheric surfaces and a long processing period make it difficult to reduce the cost.

In JP-A-2008-128913, which discloses a case where a polyethylene lens is used to correct aberrations and a silicon lens is used to collect light, since the polyethylene lens is disposed in a position closest to an object, the polyethylene lens is inevitably degraded by an external force and ultraviolet radiation. Further, since the optical system is not symmetric with respect to an aperture, aberration correction capability may not be sufficient.

SUMMARY

Under the circumstances, it is desirable to provide an infrared optical system and an infrared imaging apparatus having satisfactory optical characteristics within a far-infrared range from 8 to 12 µm and achievable at low cost.

According to an embodiment of the present disclosure, there is provided an infrared optical system configured as follow.

That is, an infrared optical system according to an embodiment of the present disclosure includes a first optical element, a second optical element, a third optical element, and a fourth optical element arranged along a direction from an object side toward an image plane side.

The fourth optical element has positive refracting power, and an aperture is provided between the second optical element and the third optical element.

The first and fourth optical elements are made of any one of silicon (Si), chalcogenide glass, and zinc sulfide (ZnS).

Further, the second and third optical elements are made of a resin material, and at least one of a surface facing the object and a surface facing the image plane of each of the second and third optical elements is an aspheric surface.

According to another embodiment of the present disclosure, there is provided an infrared imaging apparatus configured as follow.

That is, an infrared imaging apparatus according to another embodiment of the present disclosure includes an infrared optical system according to the embodiment of the present disclosure, an infrared detection unit that detects infrared light collected through the infrared optical system, and an image signal acquisition unit that produces an infrared image signal based on an infrared detection signal provided from the infrared detection unit.

To achieve cost reduction, it is necessary to reduce the number of lenses used in an optical system and reduce the number of surfaces and lenses having an aspheric surface, which is difficult to process.

On the other hand, to ensure a sufficient amount of transmitted light, it is desirable to reduce the thickness of a lens.

Further, to achieve satisfactory optical characteristics, it is necessary to adequately suppress a variety of aberrations. It is effective to use an aspheric surface to correct aberrations, as described above.

In the embodiment of the present disclosure, the second and third optical elements disposed between the first optical element and the fourth optical element are made of a resin material and have aspheric surfaces, as described above.

Using a resin material allows the material cost and hence the product cost to be reduced. Further, when a lens is made of a resin material, an aspheric surface can be formed in press working or any other simple method, whereby the processing cost and hence the product cost can be reduced as compared with a case where an infrared lens of related art made, for example, of silicon undergoes aspheric surface processing.

Moreover, using a resin material allows the second and third optical elements to be thinner and hence the transmittance thereof to be readily improved.

However, simply forming an optical element that forms an optical system with a resin material typically leads to degradation in performance of the resin optical element due to ultraviolet radiation. To address the problem, in the embodiment of the present disclosure, the second and third optical elements are sandwiched between the first and fourth optical elements made of anyone of silicon, chalcogenide glass, and zinc sulfide. In this case, since the first and fourth optical elements are made of a crystalline material having low transmittance in the visible range, the second and third optical elements made of a resin can be effectively protected from visible light.

According to the embodiments of the present disclosure, an infrared optical system and an infrared imaging apparatus having satisfactory optical characteristics within a far-infrared range and achievable at low cost are provided.

DETAILED DESCRIPTION

A form for carrying out the present disclosure (hereinafter referred to as an embodiment) will be described below.

The description will be made in the following order.
<1. Infrared optical system and infrared imaging apparatus according to embodiment>
[1-1. Configuration of infrared imaging apparatus]
[1-2. Summary of infrared optical system according to embodiment]
<2. Specific examples>
[2-1. Example 1]
[2-2. Example 2]
[2-3. Example 3]
<3. Variations>

1. INFRARED OPTICAL SYSTEM AND INFRARED IMAGING APPARATUS ACCORDING TO EMBODIMENT 1-1. Configuration of Infrared Imaging Apparatus FIG. 1 is a block diagram showing an internal configuration of an infrared imaging apparatus 1 according to an embodiment of the present disclosure.

Figure 1:
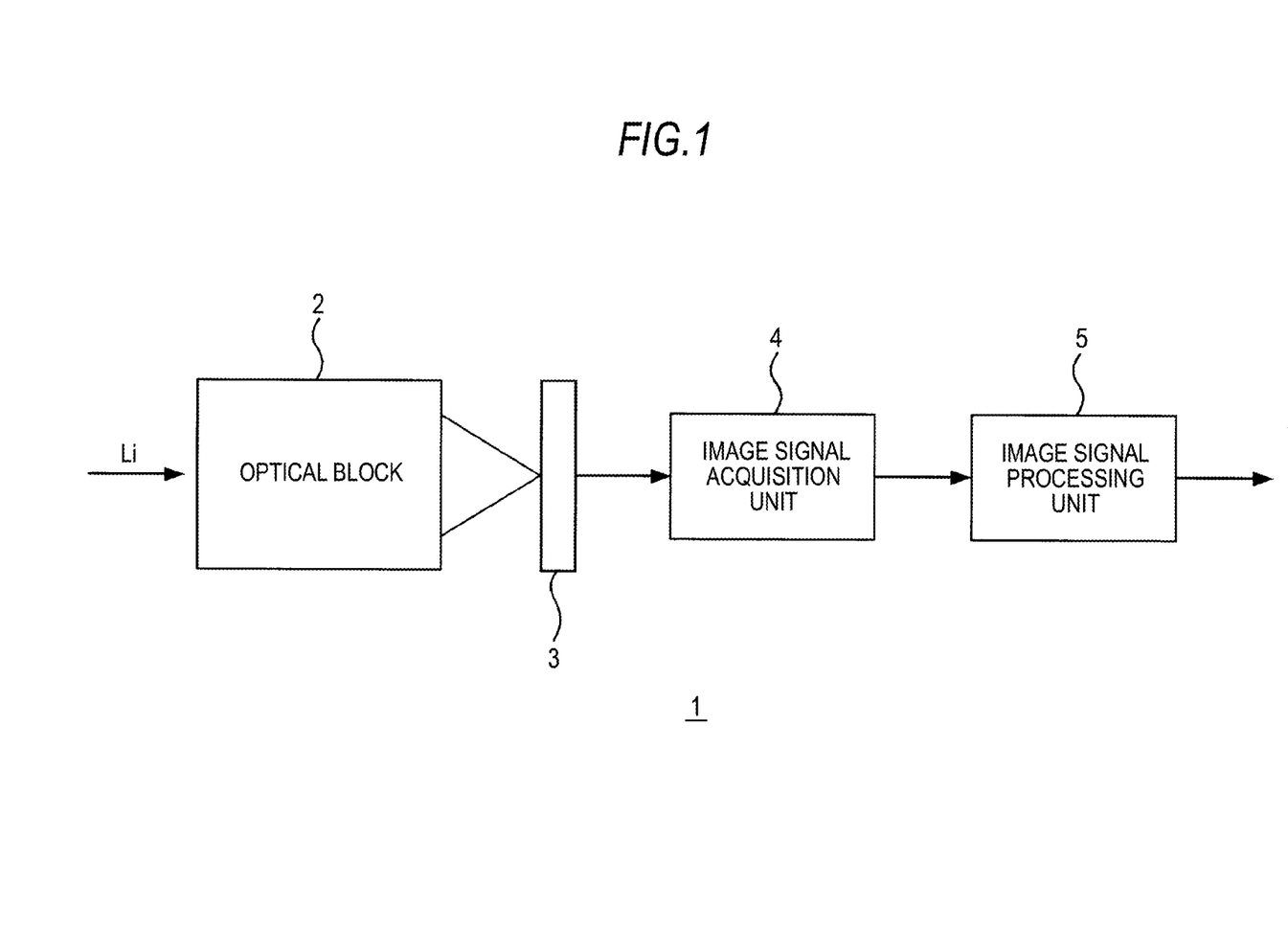
FIG. 1 is a block diagram showing an internal configuration of an infrared imaging apparatus 1 according to an embodiment.

The infrared imaging apparatus 1 includes an optical block 2, an image sensor 3, an image signal acquisition unit 4, and an image signal processing unit 5, as shown in FIG. 1.

The optical block 2 collectively represents an infrared optical system according to an embodiment that will be described later. The optical block 2 collects infrared light (infrared radiation), which is indicated as incident light Li in FIG. 1, from a subject (object) on an imaging surface (image plane) of the image sensor 3.

The image sensor 3 detects the infrared radiation collected by the optical block 2 and produces an infrared detection signal according to the amount of infrared radiation from the subject.

To produce the infrared detection signal, an infrared detection device that should be accommodated in the image sensor 3 is, for example, a pyroelectric device. Alternatively, a thermopile device to which a thermocouple that produces a Seebeck effect is connected, a bolometer device using a phenomenon in which resistance changes as the temperature rises, and other infrared detection devices can also be used.

The infrared detection device should not be limited to those described above but can be any device capable of detecting infrared radiation.

The image signal acquisition unit 4 receives the infrared detection signal produced by the image sensor 3 (detection signal produced by each infrared detection device described above) and produces an infrared image signal.

The image signal processing unit 5 performs a variety of image signal processing operations on the captured image signal produced by the image signal acquisition unit 4. For example, the image signal processing unit 5 performs black level correction, defective pixel interpolation, aberration correction, optical shading correction, lens distortion correction, temperature adjustment, calculation of the amount of change in distance, and coding.

An output from the image signal processing unit 5 is delivered to a display (image display apparatus) external to the imaging apparatus via an interface and other components (not shown).

1-2. Summary of Infrared Optical System According to Embodiment

Figure 2:
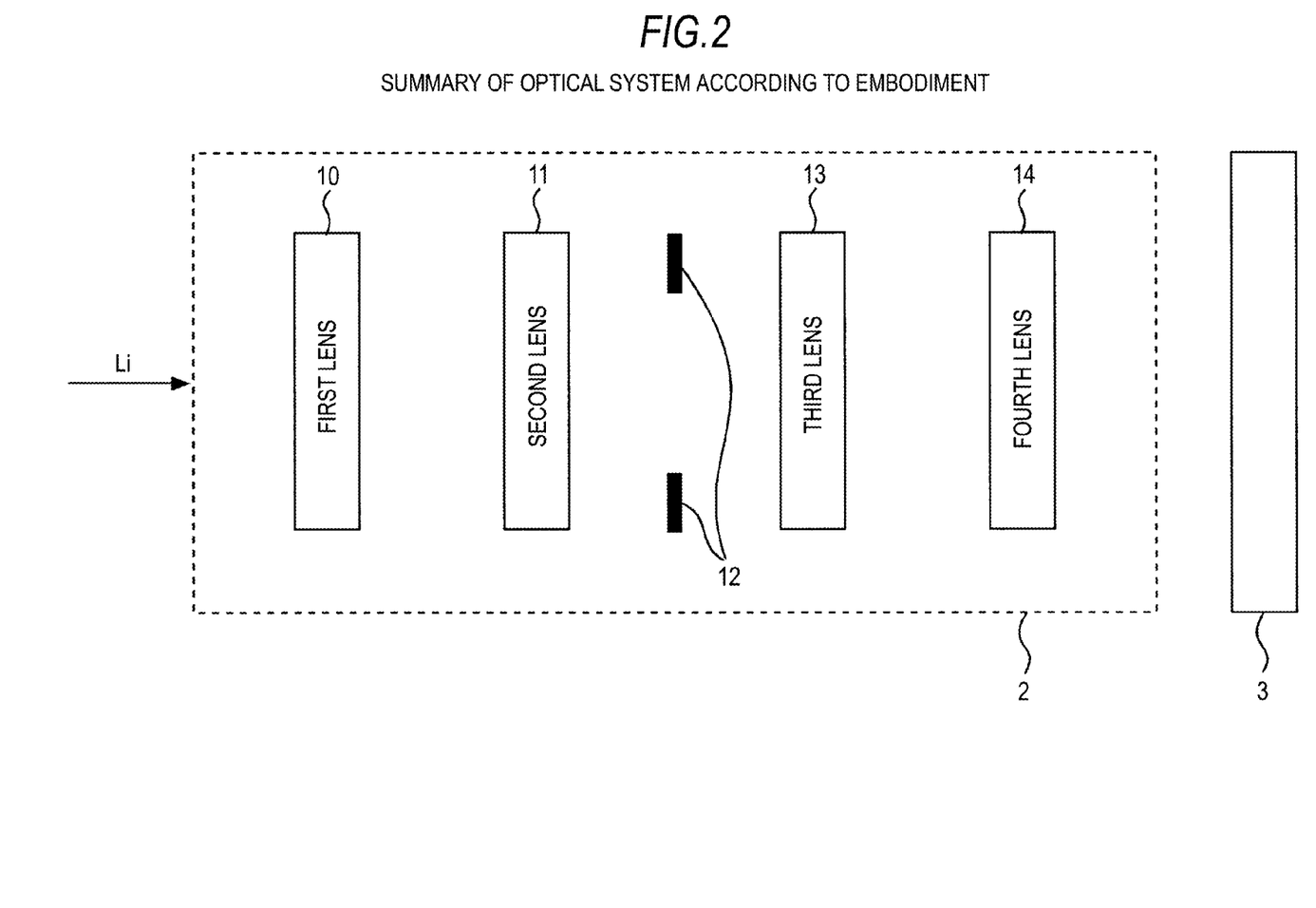
FIG. 2 summarizes of the configuration of an infrared optical system according to the embodiment.

FIG. 2 summarizes of an internal configuration of the optical block 2.

FIG. 2 also shows the image sensor 3 along with the summary of the inside of the optical block 2.

The optical block 2 according to the embodiment includes a first lens 10, a second lens 11, a third lens 13, and a fourth lens 14 arranged in the direction from the object side to the image plane side, as shown in FIG. 2. Further, an aperture stop 12 is provided between the second lens 11 and the third lens 13.

In the optical block 2, the first lens 10, the second lens 11, the aperture stop 12, the third lens 13, and the fourth lens 14 are disposed in a lens barrel.

In the embodiment, the optical block 2, which includes at least the first lens 10, the second lens 11, the aperture stop 12, the third lens 13, and the fourth lens 14, employs the following configuration in order not only to provide satisfactory optical characteristics primarily within a far-infrared range (8 to 12 μm) but also to be manufactured at a low cost.

First, the first lens 10 and the fourth lens 14 are made of any one of silicon (Si), chalcogenide glass, and zinc sulfide (ZnS).

The second lens 11 and the third lens 13 are made of a resin material, and at least one of the object-side surface and the image-plane-side surface of each of the second lens 11 and the third lens 13 is an aspheric surface for aberration correction.

Forming the second lens 11 and the third lens 13 with a resin material allows the material cost and hence the product cost to be reduced. Further, when they are made of a resin material, the aspheric surfaces can be formed, for example, in injection molding or press working, whereby the manufacturing period is greatly shortened as compared with a case where a lens made of silicon or any other crystalline material undergoes surface processing, and the cost can be reduced also in this regard.

Moreover, using a resin material allows the second and third optical elements to be thinner and hence the transmittance thereof to be readily improved.

However, simply disposing a lens made of a resin material typically leads to degradation in performance of the resin lens due to ultraviolet radiation. To address the problem, in the present embodiment, the second lens 11 and the third lens 13 are sandwiched between the first lens 10 and the fourth lens 14 made of any one of silicon, chalcogenide glass, and zinc sulfide, as described above.

The first lens 10 and the fourth lens 14 are made of any one of silicon, chalcogenide glass, and zinc sulfide, in other words, made of a crystalline material having low transmittance in the visible range. In general, each lens in an optical system is disposed in a lens barrel, and no lens other than a lens disposed at an end of the lens barrel will be directly irradiated with visible light. In consideration of this condition, the configuration described above can effectively protect the second lens 11 and the third lens 13 made of a resin material from visible light.

As described above, when a lens made of a resin material is protected from visible light, degradation in performance with time in the course of actual use after product shipment can be suppressed, and a more stable infrared optical system can be provided.

A resin lens is sometimes not made of a pure resin but a resin mixed with carbon black typically in order to improve light fastness (primarily against ultraviolet radiation). Mixing carbon black, however, reduces far-infrared transmittance. It should therefore be noted that a resin mixed with carbon black may not be used to form a lens for infrared light.

Since the second lens 11 and the third lens 13 are primarily responsible for aberration correction as described above, the first lens 10 and the fourth lens 14 need no aspheric surface.

The first lens 10 and the fourth lens 14 can therefore have spherical or flat object-side and image-plane-side surfaces. Since a spherical surface or a flat surface can be more readily formed than an aspheric surface, the lens formation cost can be reduced. That is, the product cost can be reduced also in this regard.

In the embodiment, the first lens 10 has a flat object-side surface and a convex image-plane-side surface, as also will be described in the following Examples. That is, the first lens 10 has a plano-convex shape convex toward the image plane.

The fourth lens 14 has a plano-convex shape convex toward an object or has a convex object-side surface and a flat image-plane-side surface.

When the fourth lens 14 has a flat image-plane-side surface, a plane-parallel plate (sensor window 15) typically used to protect the image sensor 3 can be omitted, whereby the number of components can be reduced (see Example 2). That is, the cost can be reduced also in this regard.

Further, in the infrared optical system according to the present embodiment, in which a resin lens is used to reduce the cost, a specific selection of a resin material should be carefully made because a resin material in general greatly absorbs far-infrared radiation.

An example of a resin material that does not greatly absorb far-infrared radiation may be a polyolefin resin. Among a variety of polyolefin resins, a straight-chain polyolefin resin, a high-density polyethylene, or an ultrahigh molecular weight polyethylene can preferably be used in consideration of material cost, easiness of lens processing, lens strength, and other factors.

The high-density polyethylene used herein refers to a polyethylene having a density of 0.942 [kg/m$^3$] or higher.

The transmittance of any of the resin materials described above is, however, still lower than that of silicon, chalcogenide glass, zinc sulfide, and other crystalline materials described above.

The second lens 11 and the third lens 13 made of a resin material are therefore desirably made thin.

It can be said that the transmittance of a lens decreases when the optical path length along which light passes through the lens increases. To increase the transmittance of a lens, the thickness thereof should therefore be so set that the longest optical path length along which light (infrared radiation in this case) passes through the lens is minimized (there are a large number of light rays passing through the lens, and the longest optical path length refers to the one along which a light ray travels the longest distance).

Specifically, the longest optical path length described above is desirably 2 mm or shorter. More desirably, the longest optical path length is 1 mm or shorter in consideration of the sensitivity of the state-of-the-art image sensor 3.

In the present embodiment, each of the second lens 11 and the third lens 13 is a meniscus lens. A meniscus lens is advantageous in reduction in lens thickness and hence in improvement in infrared transmittance.

Further, in the embodiment, the second lens 11 is a meniscus lens having a convex object-side surface, and the third lens 13 is a meniscus lens having a concave object-side surface.

Since the aperture stop 12 is disposed between the second lens 11 and the third lens 13 as described above, the resultant optical configuration is symmetric with respect to the stop 12. The optical configuration therefore successfully suppresses aberrations.

Further, each of the second lens 11 and the third lens 13, which are responsible for correcting aberrations, has an effective area of each of the object-side surface and the image-plane-side surface, and the effective area (area through which infrared radiation to be received by the image sensor 3 passes or exits) is so formed that "it is continuous after twice differentiation."

For example, JP-A-10-68656 and JP-A-2009-175018 disclose resin lens-based optical systems used, for example, in human detection sensors. The resin lenses disclosed in JP-A-10-68656 and JP-A-2009-175018 have a surface that is not continuous after twice differentiation, such as a lens array and a Fresnel lens. In this case, the phase plane of an electromagnetic wave passing through an optical surface is disadvantageously shifted. The techniques described in JP-A-10-68656 and JP-A-2009-175018 therefore hardly allow a high-resolution image to be focused.

In contrast, in the present embodiment, each of the second lens 11 and the third lens 13 has an effective area of each of the object-side surface and the image-plane-side surface, and the effective area is so formed that it is continuous after twice differentiation, whereby high resolution is achieved.

JP-A-10-68656 and JP-A-2009-175018 rely on infrared sensors having a single pixel or a very small number of pixels, such as a human detection sensor. In JP-A-10-68656 and JP-A-2009-175018, it is noted that the infrared sensors do not need a very-high-resolution optical system, unlike the present embodiment, which relies on an infrared sensor having a very large number of pixels, for example, horizontal pixel size× vertical pixel size=several hundreds (or several thousands)× several hundreds (or several thousands), as an imager for capturing an infrared image.

The first lens 10 and the fourth lens 14 are desirably made of, among silicon, chalcogenide glass, zinc sulfide, and other crystalline materials described above, Si in consideration of material cost.

When Si is used, the Si preferably has a resistivity of 400 $\Omega$/cm or higher and an oxygen concentration of $1.5 \times 10^{18}$/cm$^3$ or lower and is preferably produced in a crystal growth process using an FZ (floating zone) method, a CZ (Czochralski) method, or an MCZ (magnetic field applied CZ) method.

The high resistivity and the low oxygen concentration mean that the resultant Si lens contains a small amount of impurity. It is known that that the transmittance of an Si lens within the far-infrared range increases as the amount of impurity decreases.

Figure 3:
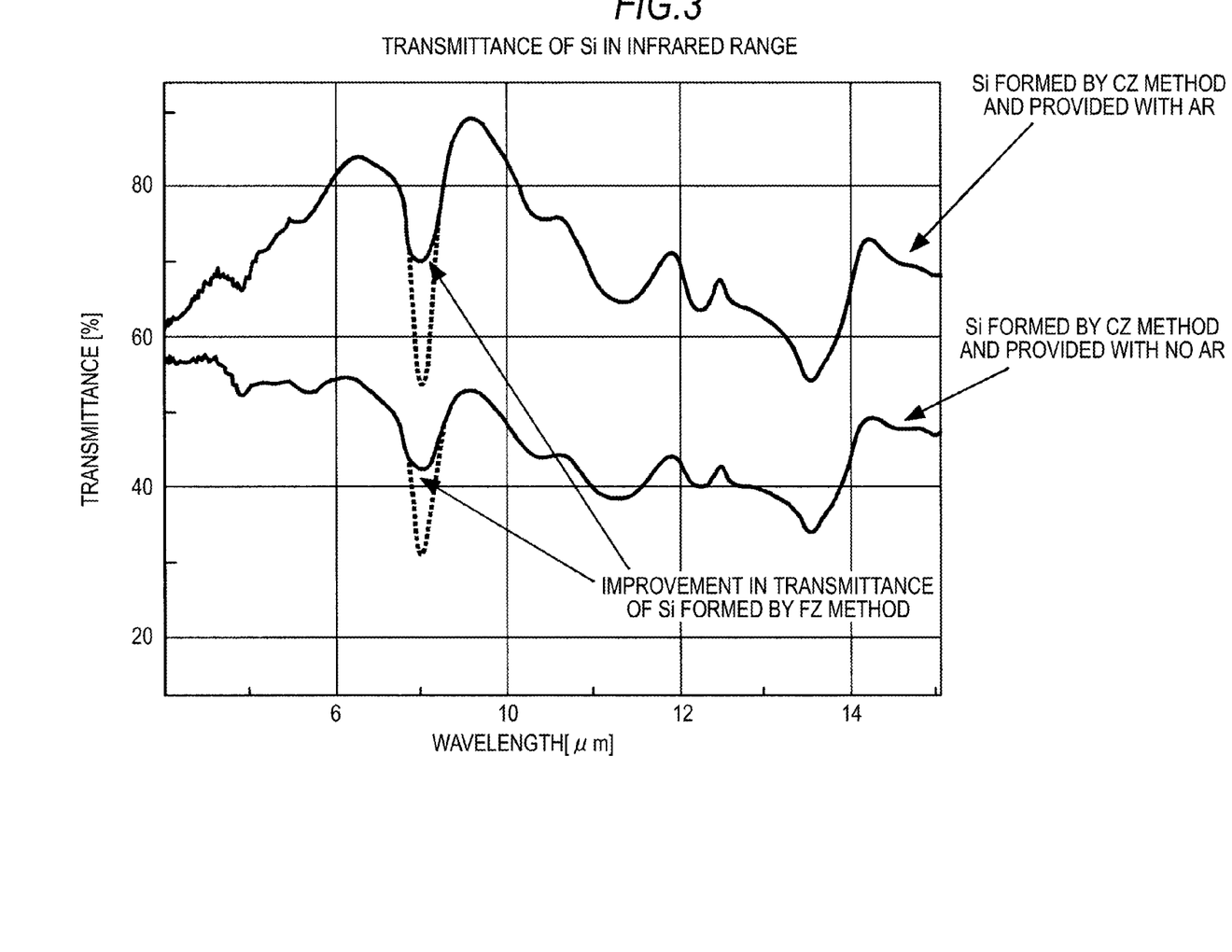
FIG. 3 shows infrared transmittance of Si produced by using an FZ method and a CZ method.

FIG. 3 shows infrared transmittance of Si produced by using the FZ method and the CZ method.

FIG. 3 shows the transmittance of Si with an AR (antireflective) coat provided thereon and with no AR coat provided thereon for each of the manufacturing methods.

The broken lines represent results of the CZ method, and the solid lines represent results of the FZ method.

As seen from FIG. 3, the Si shows a decrease in transmittance when the wavelength is 9 μm and therearound. The decrease in transmittance occurs primarily because oxygen absorbs infrared radiation.

Lowering the oxygen concentration in the Si can therefore improve the transmittance of the Si.

FIG. 3 demonstrates that the transmittance can be improved more greatly by using the FZ method than using the CZ method. That is, using the FZ method encourages reduction in oxygen concentration more greatly than using the CZ method or the MCZ method, which is based on the CZ method, whereby more satisfactory optical characteristics are achieved.

The FZ method is therefore most desirable of the three methods described above.

Further, the Si more desirably has a resistivity of 500 $\Omega$/cm or higher and an oxygen concentration of $1.3 \times 10^{18}$/cm$^3$ or lower.

Most desirably, the Si has a resistivity is 1000 $\Omega$/cm or higher and an oxygen concentration of $1.0 \times 10^{18}$/cm$^3$ or lower and is produced in a crystal growth process using the FZ manufacturing method.

In practice, the following point should also be taken into consideration in designing an infrared optical system.

In recent years, a far-infrared-based device has been increasingly used as a temperature sensor and a human detection sensor. At present, a far-infrared-based device has, however, low resolution and few devices have an optical system capable of clearly forming the shape of a target object, such as a thermo-viewer and a night vision system. It is also necessary to widen the viewing angle of an infrared optical system in order to allow far-infrared-based devices to be used in more applications in the future. Specifically, the viewing angle is desirably more than 25 degrees or even at least 50 degrees particularly when a far-infrared-based device is used in a night vision system. Further, the viewing angle is desirably at least 65 degrees in security applications.

In specific Examples described below, optical system design is performed in consideration of the point described above.

Further, since far-infrared light has low energy, an imaging device used within the visible light range may not be used, and the f number needs to be 1.8 or smaller in order to collect a greater amount of light.

Moreover, in a resolution-oriented application, such as temperature distribution measurement, the f number is desirably 1.3 or smaller in order to increase the amount of collected light and the resolution.

In Examples, optical system design was performed also in consideration of the requirements on the f number.

2. SPECIFIC EXAMPLES

2-1. Example 1

Figure 4:
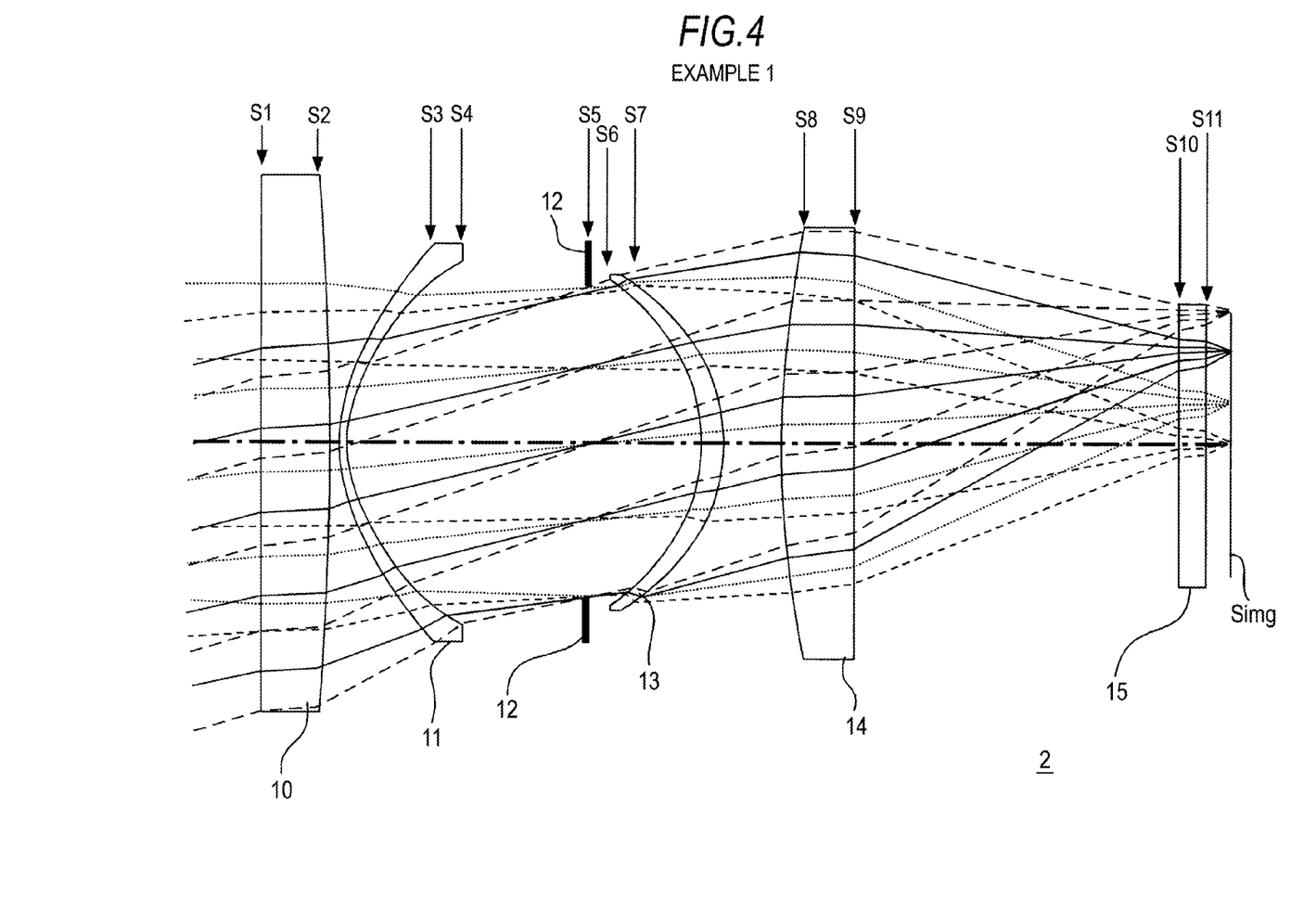
FIG. 4 shows the configuration of an infrared optical system of Example 1.

FIG. 4 shows the configuration of the optical block 2 in Example 1.

In FIG. 4, the plane Simg represents the imaging surface of the image sensor 3 shown in FIG. 1 (and FIG. 2).

FIG. 4 also shows infrared light rays.

The light rays indicated by the short broken lines in FIG. 4 represent those focused on a point at an image height of 0 mm, and the light rays indicated by the dotted broken lines represent those focused on a point at an image height of 1.5 mm.

The light rays indicated by the solid lines represent those focused on a point at an image height of 3.5 mm, and the light rays indicated by the long broken lines represent those focused on a point at an image height of 5.0 mm.

In Example 1, the first lens 10 and the fourth lens 14 are made of Si, and the second lens 11 and the third lens 13 are made of a high-density polyethylene.

In Example 1, a sensor window 15 formed of a flat member is provided as a fifth member counted from the object side. The sensor window 15 is provided to protect the imaging surface of the image sensor 3.

The sensor window 15 is also made of Si.

The first lens 10 is a plano-convex lens having positive refracting power and having a flat object-side surface and a spherical image-plane-side surface.

The second lens 11 is a meniscus lens having two aspheric surfaces and is convex toward an object.

The third lens 13 is a meniscus lens having two aspheric surfaces and is convex toward the image plane.

The fourth lens 14 has positive refracting power and has a spherical object-side surface and a flat image-plane-side surface.

Figure 5:
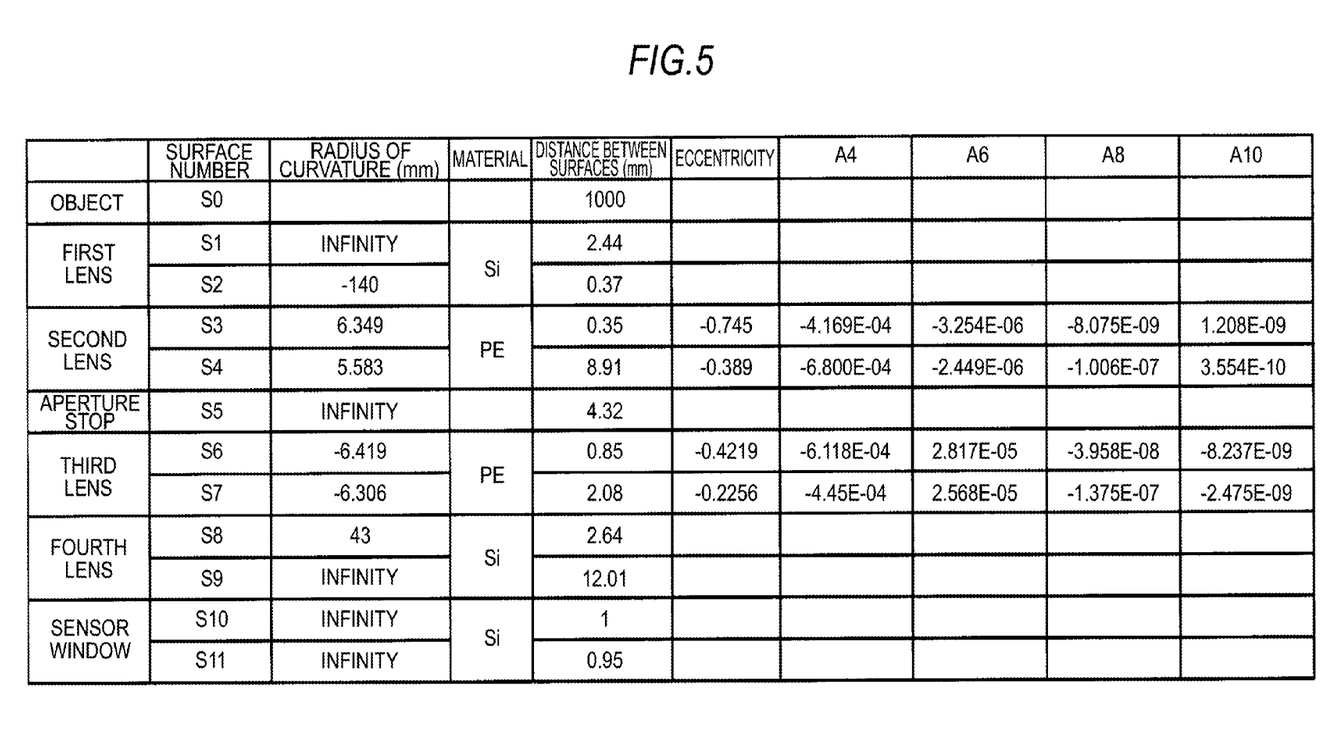
FIG. 5 shows coefficients of the shapes of lenses (and stop) and distances between the surfaces of the lenses in the infrared optical system of Example 1.

FIG. 5 shows coefficients of the shapes of the lenses (and aperture stop 12) and distances between the surfaces of the lenses.

Convex and concave surfaces of a lens are expressed as the function of the radius r as follows.

$$Z(r) = \frac{r^2/R}{1+\sqrt{1-(1+k) \times r^2/R^2}} + A_4 r^4 + A_6 r^6 + A_8 r^8 + A_{10} r^{10} + \ldots$$

In the expression, Z(r) represents the height of the lens surface at the radius r measured from the optical axis, which is taken as the center. The height of a surface is negative on the object side, and the height of a surface is positive on the image plane side. R represents the radius of curvature, k represents the eccentricity, and $A_4, A_6, A_8, A_{10}, \ldots$ represent aspheric coefficients.

In FIG. 5, a surface S0 represents an object and is placed in a position set apart from the first lens 10, which is an objective, by 1000 mm in Example 1.

A surface S1 and a surface S2 represent the object-side surface and the image-plane-side surface of the first lens 10, respectively. A surface S3 and a surface S4 represent the object-side surface and the image-plane-side surface of the second lens 11, respectively. A surface S5 represents the aperture stop 12. A surface S6 and a surface S7 represent the object-side surface and the image-plane-side surface of the third lens 13, respectively. A surface S8 and a surface S9 represent the object-side surface and the image-plane-side surface of the fourth lens 14, respectively. A surface S10 and a surface S11, which are flat surfaces, represent the object-side surface and the image-plane-side surface of the sensor window 15, respectively.

In Example 1, the refractive index of Si of which the first lens 10 and the fourth lens 14 are made is 3.4212, and the refractive index of the high-density polyethylene of which the second lens 11 and the third lens 13 are made is 1.54.

The aperture stop 12 has a diameter of 11.426 mm, and the optical block 2 has a focal length of 16 mm, an f number of 1.26, and a horizontal viewing angle of 28 degrees.

The thicknesses of the polyethylene lenses, which have lower transmittance than that of Si or any other crystalline material, were so set that the longest optical path length, which has been described above, was 0.94 mm for both the second lens 11 and the third lens 13. That is, the longest optical path length was set to be no greater than 1 mm. In this way, decrease in infrared transmittance can be suppressed.

According to the optical design described above, the effective area of each of the object-side surface and the image-plane-side surface of each of the second lens 11 and the third lens 13 is so formed that the effective area is continuous after twice differentiation. That is, the shift of the phase plane described above can be suppressed, whereby the resolution can be improved.

Figure 6:
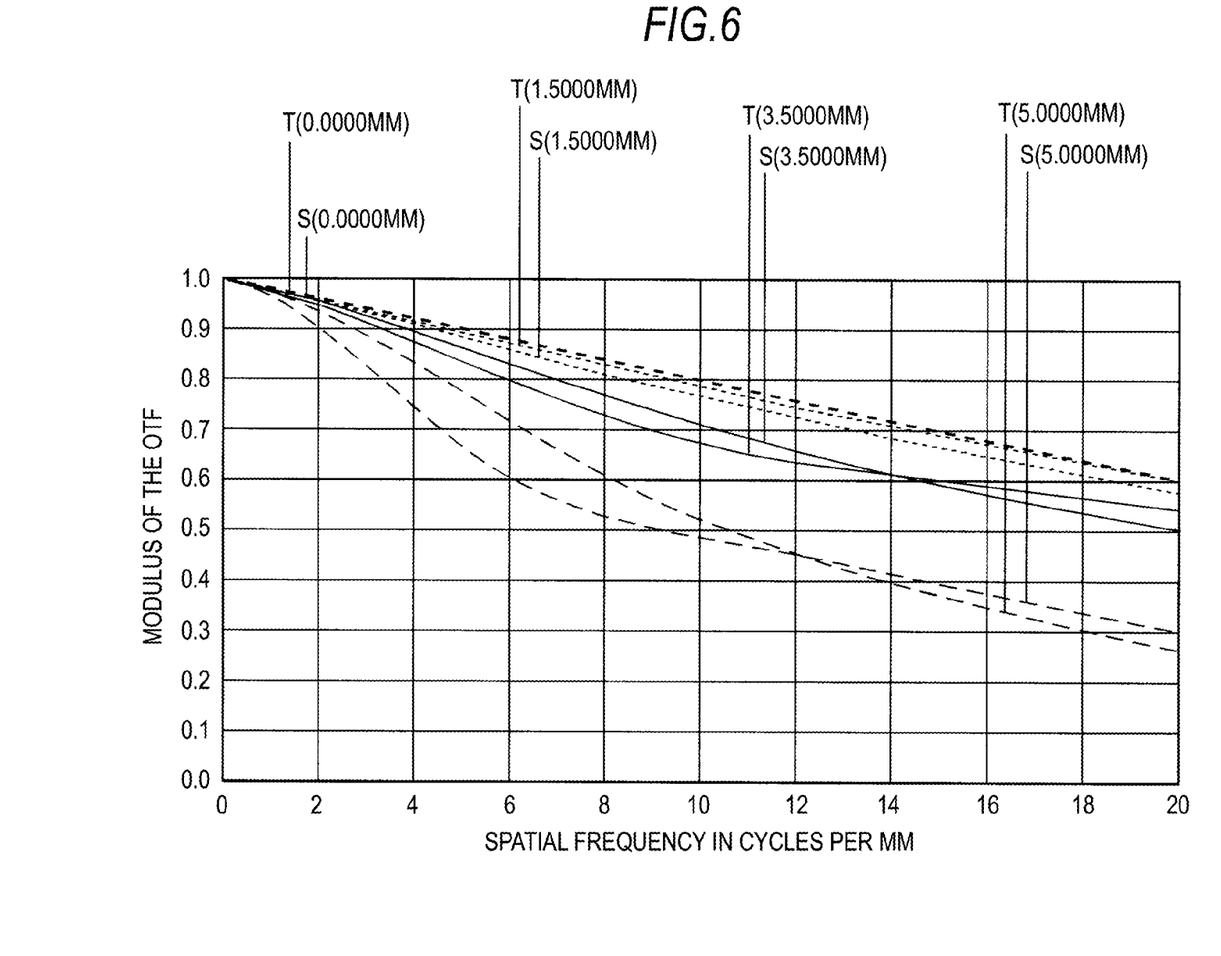
FIG. 6 shows a resolution characteristic (MTF) of the infrared optical system of Example 1 at a variety of image heights (0 mm, 1.5 mm, 3.5 mm, and 5.0 mm)

FIG. 6 shows a resolution characteristic (MTF) of the optical block 2 of Example 1 at the variety of image heights (0 mm, 1.5 mm, 3.5 mm, and 5.0 mm).

Specifically, in FIG. 6, which shows the characteristic at the variety of image heights, the horizontal axis represents the spatial frequency (lines/mm) and the vertical axis represents the OTF (optical transfer function).

In FIG. 6, the variety of types of lines represent the same things as described above: the short broken lines correspond to the light rays focused on a point at the image height of 0 mm; the dotted broken lines correspond to the light rays focused on a point at the image height of 1.5 mm; the solid lines correspond to the light rays focused on a point at the image height of 3.5 mm; and the long broken lines correspond to the light rays focused on a point at the image height of 5.0 mm. Further, in FIG. 6, the symbol "T" means a tangential value, and the symbol "S" means a sagittal value.

Now, the image height of 5.0 mm is considered to be 100%. It is desirable that the MTF (OTF) value at 20 lines/mm is 0.3 or greater for the image height of 0 mm, which corresponds to 0%, and the image height of 1.5 mm, which corresponds to 30%, and that the MTF (OTF) value at 10 lines/mm is 0.3 or greater for the image height of 3.5 mm, which corresponds to 70%, and the image height of 5 mm, which corresponds to 100%.

In the infrared optical system of Example 1, the MTF value at 20 lines/mm is 0.598 for the image height of 0 mm. The tangential and sagittal values of the MTF at 20 lines/mm are 0.578 and 0.598, respectively, for the image height of 1.5 mm. The tangential and sagittal values of the MTF at 10 lines/mm are 0.674 and 0.712, respectively, for the image height of 3.5 mm. The tangential and sagittal values of the MTF at 10 lines/mm are 0.489 and 0.523, respectively, for the image height of 5.0 mm. They are all considered to be high resolution.

According to the optical system of Example 1 described above, a readily formed plano-convex lens is made of Si, which is a relatively inexpensive material, and an aberration correcting aspheric lens is made of polyethylene, which is very inexpensive and readily formed, whereby sufficient resolution is achieved while a wide viewing angle of about 30 degrees is provided and increase in cost is minimized.

2-2. Example 2

Figure 7:
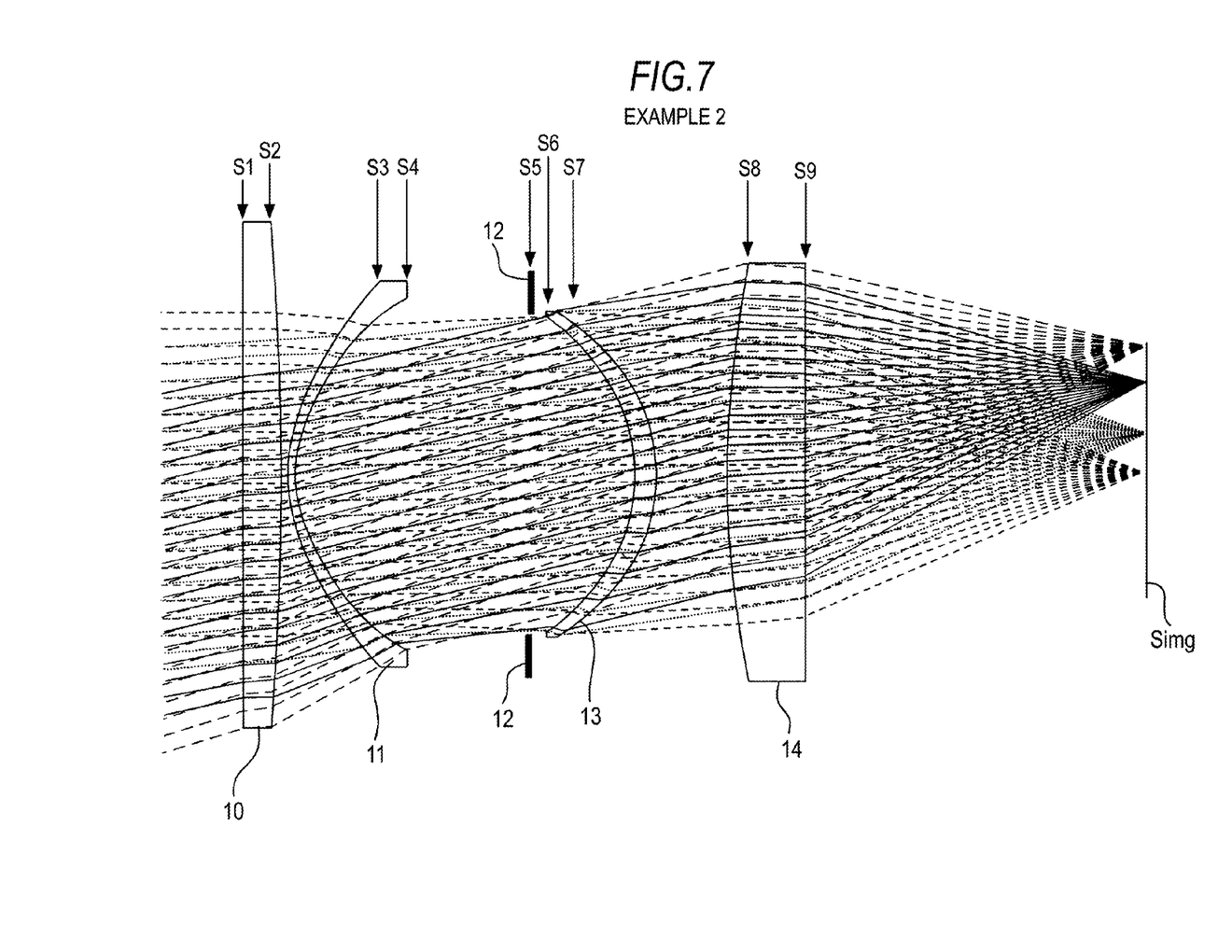
FIG. 7 shows the configuration of an infrared optical system of Example 2.

FIG. 7 shows the configuration of the optical block 2 in Example 2.

FIG. 7 also shows infrared light rays that are focused at the variety of image heights (0 mm, 1.5 mm, 3.5 mm, and 5.0 mm). In FIG. 7, the variety of types of lines represent the same things as described above: the short broken lines correspond to light rays focused on a point at the image height of 0 mm; the dotted broken lines correspond to light rays focused on a point at the image height of 1.5 mm; the solid lines correspond to light rays focused on a point at the image height of 3.5 mm; and the long broken lines correspond to light rays focused on a point at the image height of 5.0 mm.

In Example 2, the sensor window 15, which is provided in Example 1, is omitted. The number of parts is thus reduced, whereby the cost is reduced.

In Example 2 as well, the first lens 10 and the fourth lens 14 are made of Si, and the second lens 11 and the third lens 13 are made of a high-density polyethylene.

In this case as well, the first lens 10 is a plano-convex lens having positive refracting power and having a flat object-side surface and a spherical image-plane-side surface.

The second lens 11 is a meniscus lens having two aspheric surfaces and is convex toward an object in this case as well. The third lens 13 is a meniscus lens having two aspheric surfaces and is convex toward the image plane in this case as well.

The fourth lens 14 has positive refracting power and has a spherical object-side surface and a flat image-plane-side surface, as in Example 1.

Figure 8:
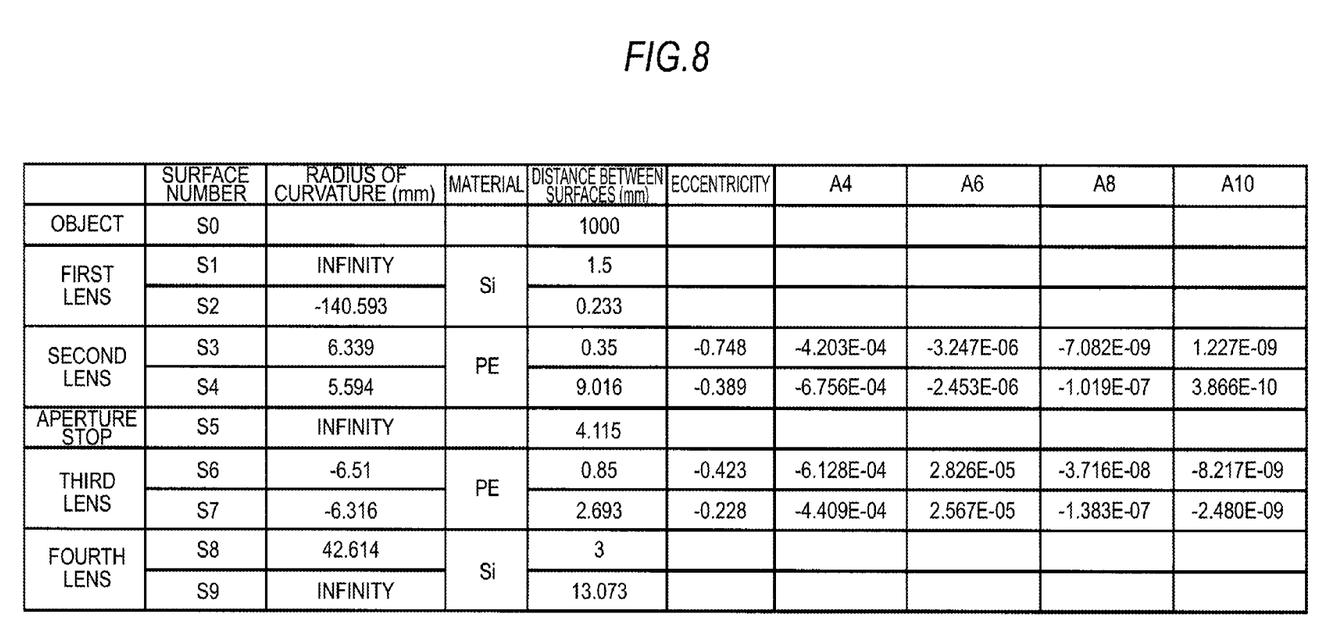
FIG. 8 shows coefficients of the shapes of lenses (and stop) and distances between the surfaces of the lenses in the infrared optical system of Example 2.

FIG. 8 shows coefficients of the shapes of the lenses (and aperture stop 12) and distances between the surfaces of the lenses in Example 2.

The surface numbers are defined in the same manner as in Example 1.

An object on the surface S0 is placed in a position set apart from the first lens 10, which is an objective, by 1000 mm in this case as well.

The refractive index of Si of which the first lens 10 and the fourth lens 14 are made, the refractive index of the high-density polyethylene of which the second lens 11 and the third lens 13 are made, the diameter of the aperture stop 12, the focal length, the f number, and the horizontal viewing angle are the same as those in Example 1 in this case as well.

The thickness of each of the second lens 11 and the third lens 13 is so set that the longest optical path length described above is 0.93 mm (that is, the longest optical path length is no greater than 1 mm).

According to the design described above, the effective area of each of the object-side surface and the image-plane-side surface of each of the second lens 11 and the third lens 13 is so formed that the effective area is continuous after twice differentiation, that is, the shift of the phase plane can be suppressed, whereby the resolution can be improved in this case as well.

Figure 9:
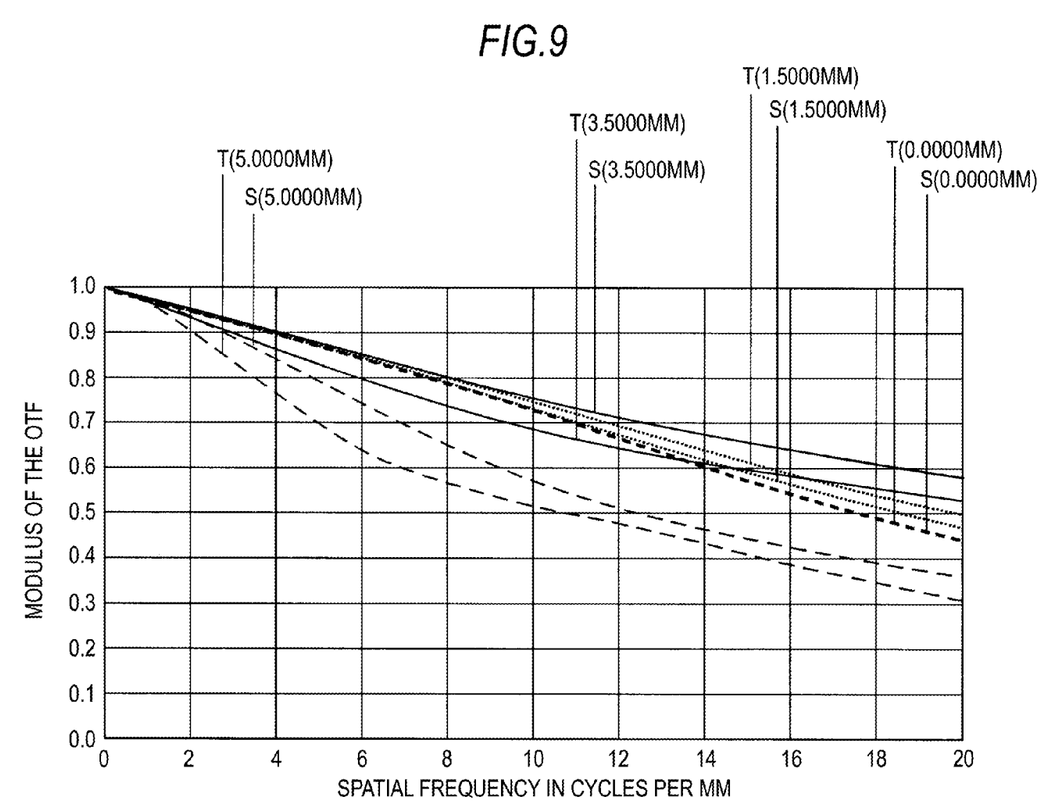
FIG. 9 shows the resolution characteristic (MTF) of the infrared optical system of Example 2 at the variety of image heights (0 mm, 1.5 mm, 3.5 mm, and 5.0 mm)

FIG. 9 shows the resolution characteristic (MTF) of the optical block 2 of Example 2 at the variety of image heights (0 mm, 1.5 mm, 3.5 mm, and 5.0 mm).

In FIG. 9 as well, the horizontal axis represents the spatial frequency (lines/mm) and the vertical axis represents the OTF.

In the optical system of Example 2, the MTF value at 20 lines/mm is 0.441 for the image height of 0 mm. The tangential and sagittal values of the MTF at 20 lines/mm are 0.47 and 0.499, respectively, for the image height of 1.5 mm. The tangential and sagittal values of the MTF at 10 lines/mm are 0.687 and 0.758, respectively, for the image height of 3.5 mm. The tangential and sagittal values of the MTF at 10 lines/mm are 0.523 and 0.575, respectively, for the image height of 5.0 mm. They are all considered to be high resolution.

According to the optical system of Example 2 described above, a readily formed plano-convex lens is made of Si, which is a relatively inexpensive material, an aberration correcting aspheric lens is made of polyethylene, which is very inexpensive and readily formed. Further, the fourth lens 14 also serves as the sensor window 15. As a result, sufficient resolution is achieved while a wide viewing angle of about 30 degrees is provided and increase in cost is minimized.

2-3. Example 3

Figure 10:
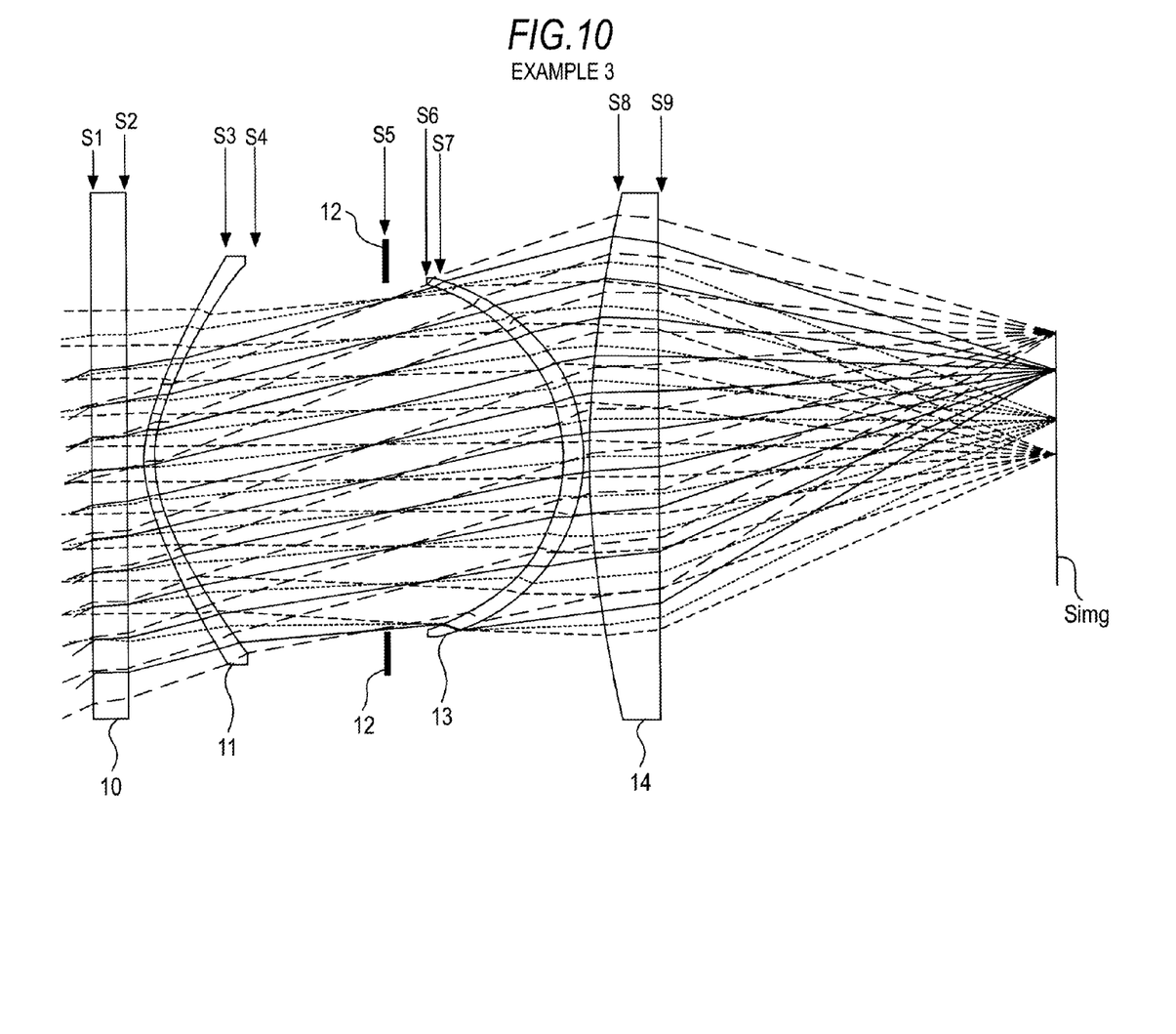
FIG. 10 shows the configuration of an infrared optical system of Example 3.

FIG. 10 shows the configuration of the optical block 2 in Example 3.

FIG. 10 also shows infrared light rays that are focused at the variety of image heights (0 mm, 1.5 mm, 3.5 mm, and 5.0 mm). In FIG. 10, the variety of types of lines represent the same things as described above: the short broken lines correspond to light rays focused on a point at the image height of 0 mm; the dotted broken lines correspond to light rays focused on a point at the image height of 1.5 mm; the solid lines correspond to light rays focused on a point at the image height of 3.5 mm; and the long broken lines correspond to light rays focused on a point at the image height of 5.0 mm.

In Example 3, the sensor window 15, which is provided in Example 1, is omitted, as in Example 2. The number of parts is thus reduced, whereby the cost is reduced.

In Example 3 as well, the first lens 10 and the fourth lens 14 are made of Si, and the second lens 11 and the third lens 13 are made of a high-density polyethylene.

In Example 3, the first lens 10 is a flat member. That is, the first lens 10 in Example 3 has a flat object-side surface and a flat image-plane-side surface.

The other lenses are configured as follows: The second lens 11 is a meniscus lens having two aspheric surfaces and is convex toward an object in this case as well. The third lens 13 is a meniscus lens having two aspheric surfaces and is convex toward the image plane in this case as well.

The fourth lens 14 has positive refracting power and has a spherical object-side surface and a flat image-plane-side surface, as in Examples 1 and 2.

Figure 11:
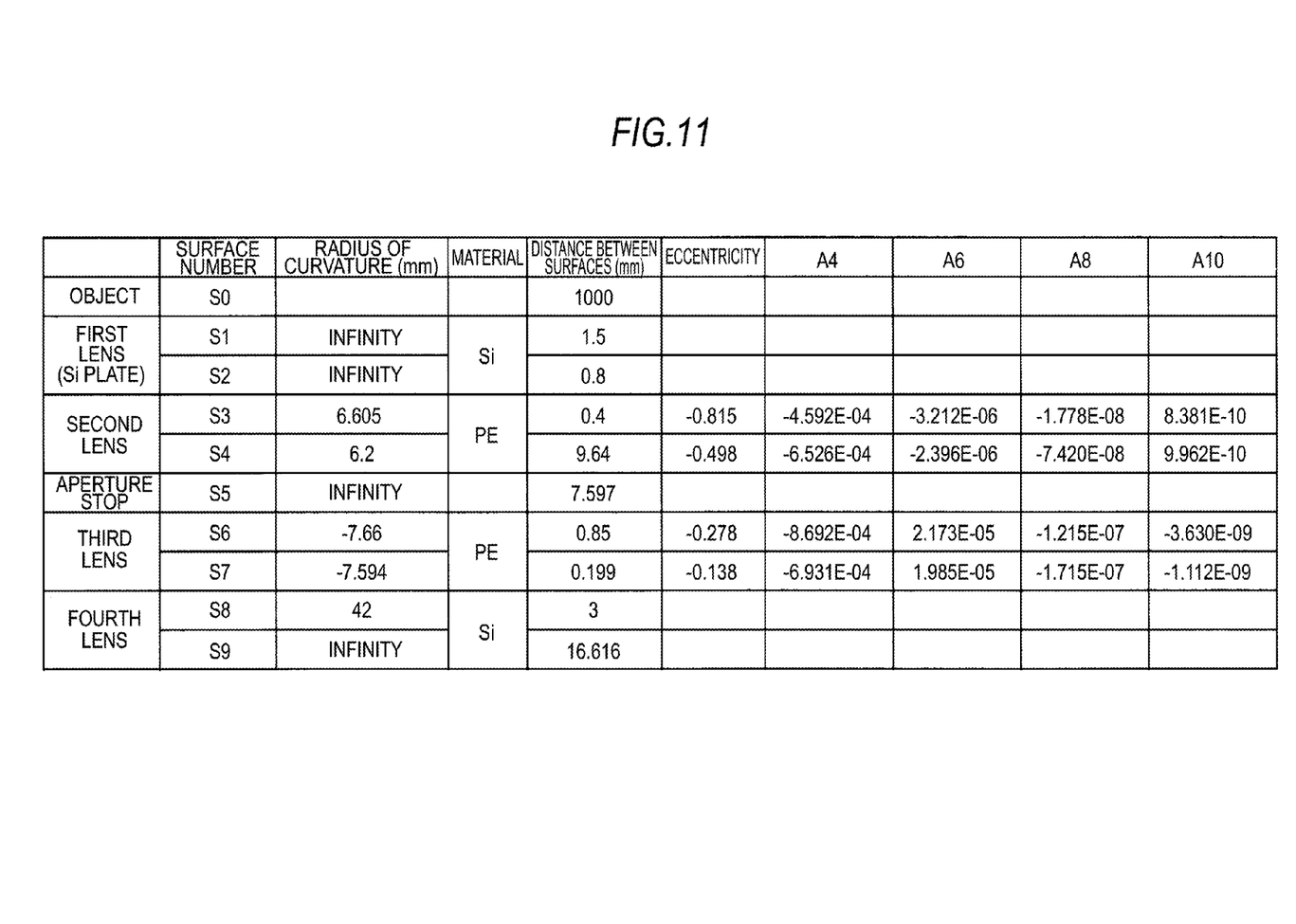
FIG. 11 shows coefficients of the shapes of lenses (and stop) and distances between the surfaces of the lenses in the infrared optical system of Example 3.

FIG. 11 shows coefficients of the shapes of the lenses (and aperture stop 12) and distances between the surfaces of the lenses in Example 3.

The surface numbers are defined in the same manner as in Example 1.

An object on the surface S0 is placed in a position set apart from the first lens 10, which is an objective, by 1000 mm in this case as well.

The refractive index of Si of which the first lens 10 and the fourth lens 14 are made, the refractive index of the high-density polyethylene of which the second lens 11 and the third lens 13 are made, the diameter of the aperture stop 12, the focal length, the f number, and the horizontal viewing angle are the same as those in Example 1 in this case as well.

The thickness of each of the second lens 11 and the third lens 13 is so set that the longest optical path length described above is 0.62 mm.

According to the design described above, the effective area of each of the object-side surface and the image-plane-side surface of each of the second lens 11 and the third lens 13 is so formed that the effective area is continuous after twice differentiation. That is, the shift of the phase plane can be suppressed, whereby the resolution can be improved in this case as well.

Figure 12:
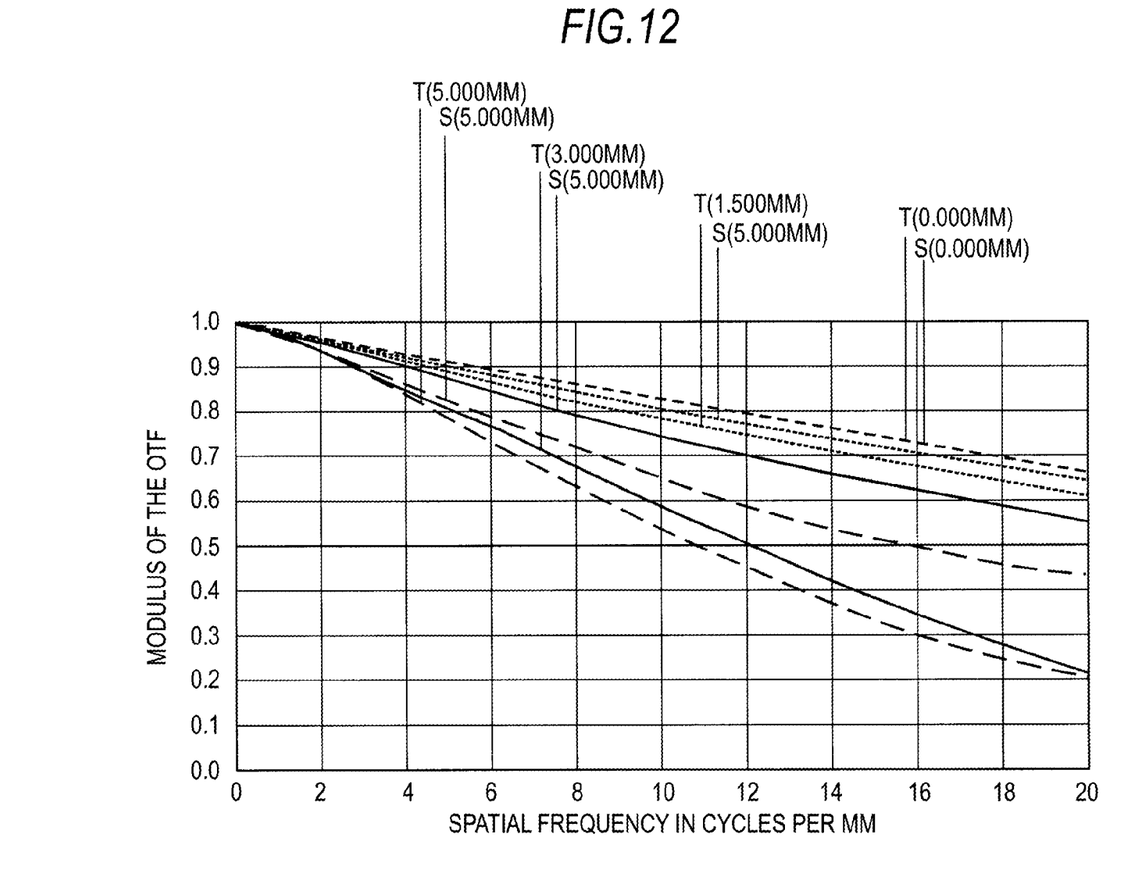
FIG. 12 shows the resolution characteristic (MTF) of the infrared optical system of Example 3 at the variety of image heights (0 mm, 1.5 mm, 3.5 mm, and 5.0 mm).

FIG. 12 shows the resolution characteristic (MTF) of the optical block 2 of Example 3 at the variety of image heights (0 mm, 1.5 mm, 3.5 mm, and 5.0 mm).

In FIG. 12 as well, the horizontal axis represents the spatial frequency (lines/mm) and the vertical axis represents the OTF.

In the optical system of Example 3, the MTF value at 20 lines/mm is 0.661 for the image height of 0 mm. The tangential and sagittal values of the MTF at 20 lines/mm are 0.601 and 0.643, respectively, for the image height of 1.5 mm. The tangential and sagittal values of the MTF at 10 lines/mm are 0.597 and 0.745, respectively, for the image height of 3.5 mm. The tangential and sagittal values of the MTF at 10 lines/mm are 0.553 and 0.652, respectively, for the image height of 5.0 mm. They are all considered to be high resolution.

According to the optical system of Example 3 described above, a readily formed plano-convex lens or a flat plate is made of Si, which is a relatively inexpensive material, and an aberration correcting aspheric lens is made of polyethylene, which is very inexpensive and readily formed. Further, the fourth lens 14 also serves as the sensor window 15. As a result, sufficient resolution is achieved while a wide viewing angle of about 30 degrees is provided and increase in cost is minimized.

3. VARIATIONS

The infrared optical system and the infrared imaging apparatus according to the embodiment and examples of the present disclosure have been described above. The present disclosure, however, should not be limited to the specific examples described above.

For example, in each of Examples, in which the resin material of which the second lens 11 and the third lens 13 are made is a high-density polyethylene by way of example, any other resin material that has improved transmittance in the far-infrared range can, of course, be used.

Further, the first lens 10 and the fourth lens 14 are made of the same crystalline material by way of example, but they can alternatively be made of different materials selected from silicon, chalcogenide glass, and zinc sulfide.

Similarly, the second lens 11 and the third lens 13 are not necessarily made of the same material but may alternatively be made of different materials.

Further, at least one of the object-side surface and the image-plane-side surface of the second lens 11 or the third lens 13, which are made of a resin material, may have a diffraction structure that can suppress chromatic aberrations produced among light rays having different wavelengths.

The present disclosure contains subject matter related to that disclosed in Japanese Priority Patent Application JP 2011-000925 filed in the Japan Patent Office on Jan. 6, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An infrared optical system comprising:
   a first optical element, a second optical element, a third optical element, and a fourth optical element arranged along a direction from an object side toward an image plane side,
   wherein the fourth optical element has positive refracting power,
   an aperture is provided between the second optical element and the third optical element,
   the first and fourth optical elements are made of any one of silicon (Si), chalcogenide glass, and zinc sulfide (ZnS), and
   the second and third optical elements are made of a resin material, and at least one of a surface facing the object and a surface facing the image plane of each of the second and third optical elements is an aspheric surface.

2. The infrared optical system according to claim 1, wherein the resin material of which the second and third optical elements are made is a polyolefin resin.

3. The infrared optical system according to claim 2, wherein the resin material is a straight-chain polyolefin resin.

4. The infrared optical system according to claim 2, wherein the resin material is a high-density polyethylene or an ultrahigh molecular weight polyethylene.

5. The infrared optical system according to claim 1, wherein each of the second and third optical elements has a thickness so set that the longest optical path length along which light passing therethrough travels is 2 mm or shorter.

6. The infrared optical system according to claim 5, wherein the longest optical path length in each of the second and third optical elements is 1 mm or shorter.

7. The infrared optical system according to claim 1, wherein an effective area of each of the surface facing the object and the surface facing the image plane of each of the second and third optical elements is so formed that the effective area is continuous after twice differentiation.

8. The infrared optical system according to claim 1, wherein a diffraction structure is provided on any one of the surfaces of the second and third optical elements.

9. The infrared optical system according to claim 1, wherein the second optical element is a meniscus lens having a convex object-side surface, and the third optical element is a meniscus lens having a concave object-side surface.

10. The infrared optical system according to claim 1, wherein the first and fourth optical elements are made of silicon, and
the silicon is produced in a crystal growth process by using any one of an FZ (floating zone) method, a CZ (Czochralski) method, or an MCZ (magnetic field applied CZ) method and has a resistivity of 400Ω/cm or higher and an oxygen concentration of $1.5 \times 10^{18}/cm^3$ or lower.

11. The infrared optical system according to claim 1, wherein the first optical element has the surface facing the object and the surface facing the image plane, one of which is a flat surface and the other one of which is a spherical surface.

12. The infrared optical system according to claim 11, wherein the surface of the first optical element that faces the object is a flat surface.

13. The infrared optical system according to claim 1, wherein the first optical element is a flat plate.

14. The infrared optical system according to claim 1, wherein the fourth optical element has the surface facing the object and the surface facing the image plane, one of which is a flat surface and the other one of which is a spherical surface.

15. The infrared optical system according to claim 14, wherein the surface of the fourth optical element that faces the image plane is a flat surface.

16. The infrared optical system according to claim 1, wherein the infrared optical system has an f number of 1.8 or smaller and a viewing angle of 25 degrees or greater.

17. An infrared imaging apparatus comprising:
an infrared optical system including a first optical element, a second optical element, a third optical element, and a fourth optical element arranged along a direction from an object side toward an image plane side, the fourth optical element having positive refracting power, an aperture provided between the second optical element and the third optical element, the first and fourth optical elements made of any one of silicon (Si), chalcogenide glass, and zinc sulfide (ZnS), and the second and third optical elements are made of a resin material, at least one of a surface facing the object and a surface facing the image plane of each of the second and third optical elements being an aspheric surface;
an infrared detection unit that detects infrared light collected through the infrared optical system; and
an image signal acquisition unit that produces an infrared image signal based on an infrared detection signal provided from the infrared detection unit.

* * * * *